United States Patent [19]

Gryp

[11] Patent Number: 5,482,354
[45] Date of Patent: Jan. 9, 1996

[54] SWIVEL SEAT, ESPECIALLY FOR VEHICLES

[75] Inventor: Dennis J. Gryp, Silvis, Ill.

[73] Assignee: Sears Manufacturing Company, Davenport, Iowa

[21] Appl. No.: 625,384

[22] Filed: Dec. 11, 1990

Related U.S. Application Data

[63] Continuation of Ser. No. 445,216, Dec. 4, 1989, abandoned.

[51] Int. Cl.$^6$ ........................................... A47C 1/02
[52] U.S. Cl. ............................................ 297/344.22
[58] Field of Search ........................... 297/349, 344.21, 297/344.22; 108/20, 21, 22; 248/430, 429, 425

[56] References Cited

U.S. PATENT DOCUMENTS

| | | | |
|---|---|---|---|
| 1,337,059 | 4/1920 | Fisher | 297/349 |
| 2,809,690 | 10/1957 | Walther et al. | 248/425 X |
| 3,134,568 | 5/1964 | Carson . | |
| 3,570,800 | 3/1971 | Cycowicz | 248/425 X |
| 3,593,954 | 7/1971 | Ritchie | 248/425 X |
| 3,659,895 | 5/1972 | Dresden | 248/430 X |
| 3,789,444 | 2/1974 | McCord . | |
| 3,860,203 | 1/1975 | Colautti | 297/349 X |
| 4,097,016 | 6/1978 | Petrucci | 297/349 X |
| 4,570,997 | 2/1986 | Tanizaki et al. | 297/349 |
| 4,792,188 | 12/1988 | Kawashima | 297/349 |

FOREIGN PATENT DOCUMENTS

| | | | |
|---|---|---|---|
| 771457 | 11/1967 | Canada | 297/349 |

*Primary Examiner*—Jose V. Chen
*Attorney, Agent, or Firm*—Henderson & Sturm

[57] ABSTRACT

Swivel mechanism for a vehicle seat, for example, includes a lower support-attachable element and a superimposed seat-carrying element interconnected by a turntable providing for 360° angular movement of the upper element about an upright axis, together with latch structure for selectively locking the upper element in plural modes in angular ranges within the 360° range. The turntable structure is in the form of an annulus through which securing bolts or the like pass upwardly for receipt by a retainer atop the upper element, the latter having a circular opening therein coaxial with the turntable and through which the securing bolts also pass to provide a rugged connection between the elements for resisting forces tending to separate the elements.

15 Claims, 5 Drawing Sheets

5,482,354

SWIVEL SEAT, ESPECIALLY FOR VEHICLES

BACKGROUND AND SUMMARY OF THE INVENTION

This application is a continuation of U.S. application Ser. No. 07/445,216 filed Dec. 4, 1989, now abandoned.

Multi-positionable seats for vehicles find particular utility in farm and industrial tractors, for example, especially in the latter when the tractor is equipped with a backhoe, typically rear-mounted and conventionally requiring a backward-facing seat to facilitate operation of the hoe. In some instances, the backhoe seat will be separate from the forward-facing seat used for driving the tractor. In other cases, one seat is provided, mounted for selective pivoting about an upright axis between forward and rear positions. The present invention relates to significant improvements in the pivoted seat category.

One problem that occurs in the pivoted or swivel seat construction is structural failure of the pivot or swivel means because of forces tending to separate the upper and lower elements thereof, especially in instances in which the seat is equipped with a seat belt fastened about the driver or operator. From the safety-requirements standpoint, regulations have been set up and dictate qualifications to be met before the seat is considered safe for operation. A basic regulation appears in SAE J386 of June 1985 (5.2.2, 5.2.3 and 5.2.4).

The seat and swivel design according to the present invention satisfies the SAE standard, featuring as it does a simple yet rugged swivel or turntable and associated securing means capable of withstanding forces tending to separate the seat-carrying swivel element from the lower vehicle-carried element. In a preferred form of the invention, the turntable is in the form of an annulus or an upright axis and securing means affixed to the lower element passes upwardly through the turntable and through a coaxial opening in the upper element for affixation to a retainer plate atop the upper element and overlying the upper element opening. Thus the retainer plate and securing means are fixed to the lower element while permitting angular movement of the upper element. In addition to the turntable, bearing means is provided between the retainer plate and upper element. The design is such that the securing means is operative to distribute stresses over relatively wide areas, thus adding to the strength of the structure. A further feature is that the downward force exerted by the securing means is limited to a degree short of overloading the bearing means and also avoiding deformation of the seat and turntable elements. The swivel or turntable means is designed to permit 360° angular movement of the seat relative to the underlying seat support.

A still further feature of the invention resides in latch mechanism for selectively locking and unlocking the seat as respects angular movement. In a preferred embodiment, the latch means is effective in one mode to lock and unlock the seat within a limited angular range less than 180°. A second mode is available in which the seat can move angularly to a position 180° from the range of positions in the first mode. In a third mode, the released latch mechanism enables turning of the seat through 360°. The seat is thus made more convenient for operator access to the controls, in one position with respect to the tractor controls and in the reversed or backward-facing position with respect to operation of the backhoe. In intermediate angular positions, the seat permits easy entering and exit of the driver to and from the seat.

The foregoing features and objects attainable by the invention will become clear as a preferred embodiment of the invention is disclosed in the ensuing specification and accompanying drawings.

DETAILED DESCRIPTION OF A PREFERRED EMBODIMENT OF THE INVENTION

Figure 1:
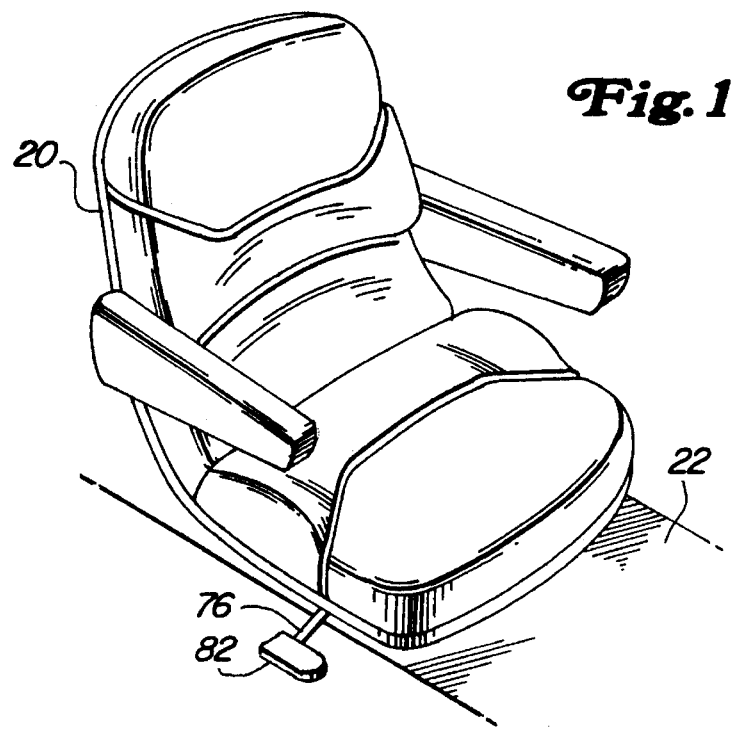
FIG. 1 is a reduced-scale perspective of a representative seat in which the invention finds utility.
Figure 8:
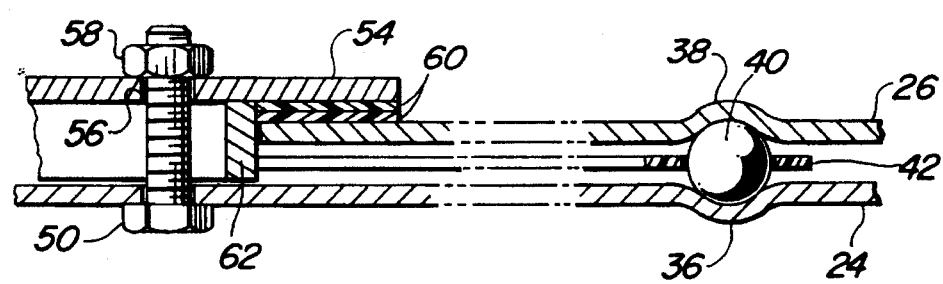
FIG. 8 is a fragmentary section on the line 8—8 of FIG. 2, showing the stop embodied in the securing means.

Reference is had first to FIG. 1 for an over-view of what is involved in the embodiment chosen for purposes of illustration. In that view a typical seat 20 is carried by an underlying support, here represented by a vehicle body 22. The basic structure carrying the seat on the vehicle body or the like appears best in FIGS. 3 through 9, immediate reference being had initially to FIG. 4.

Figure 4:
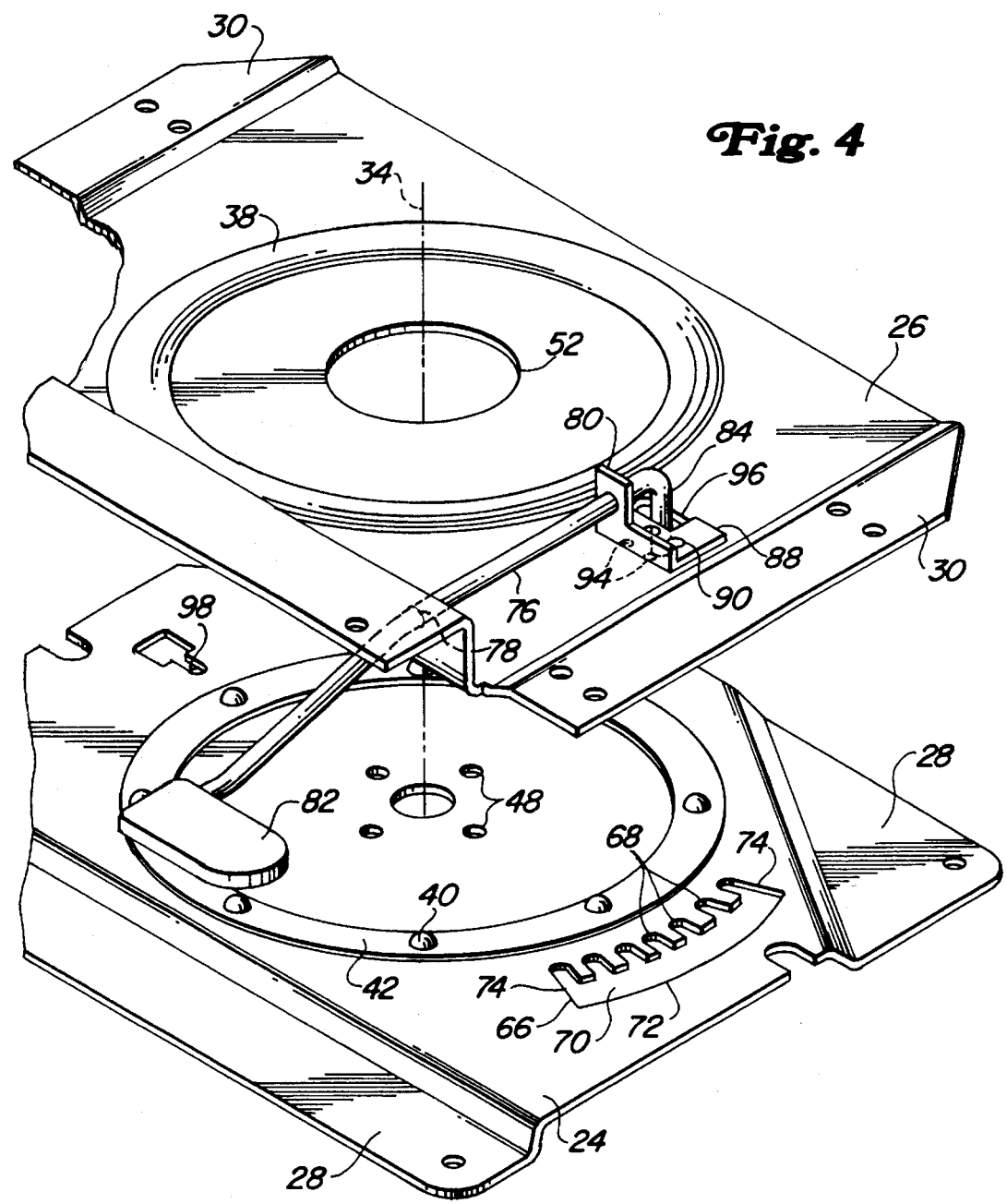
FIG. 4 is an enlarged "exploded" perspective of the upper and lower elements with the securing means omitted.
Figure 5:
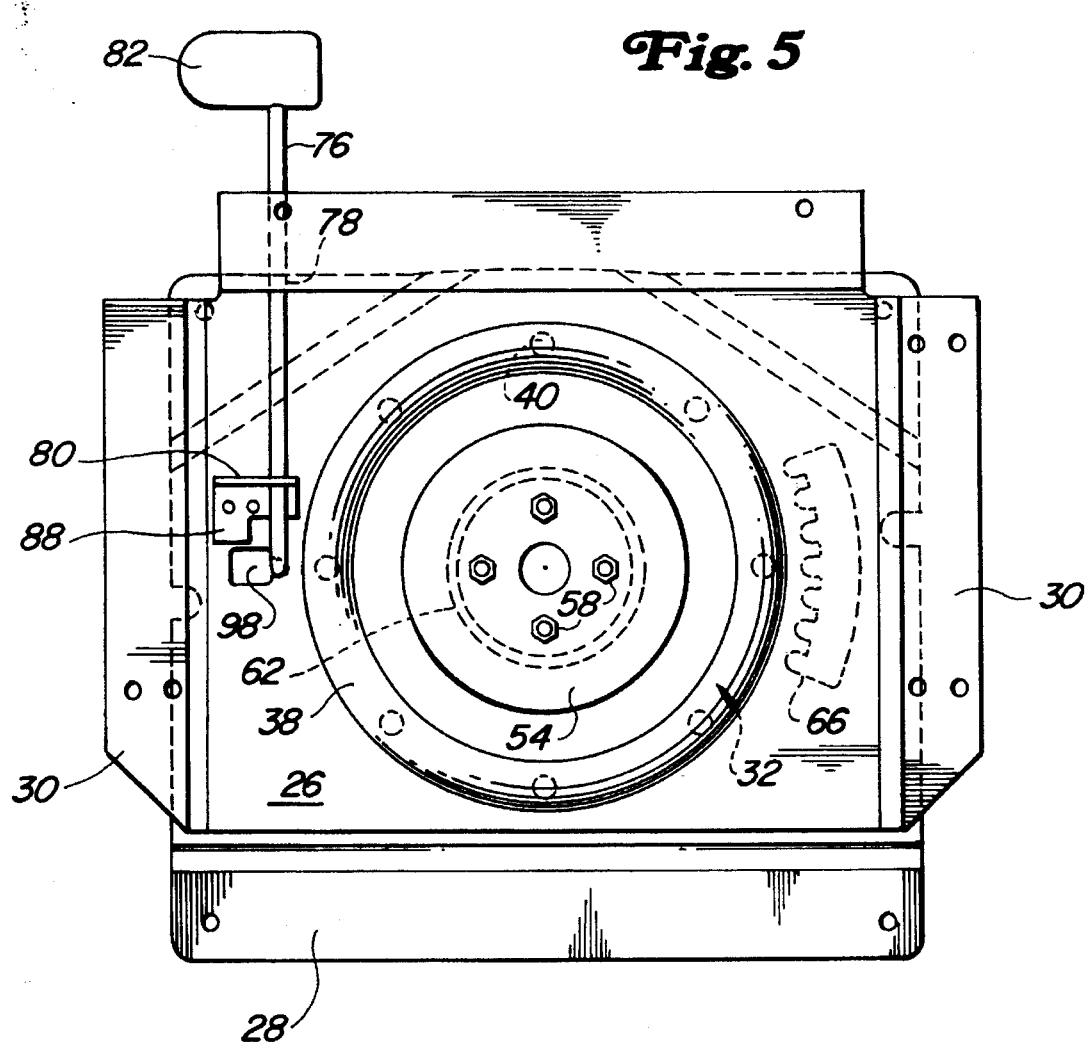
FIG. 5 is a plan, on a smaller scale, of the structure in which the upper element is turned 180° from its FIG. 2 position.
Figure 6:
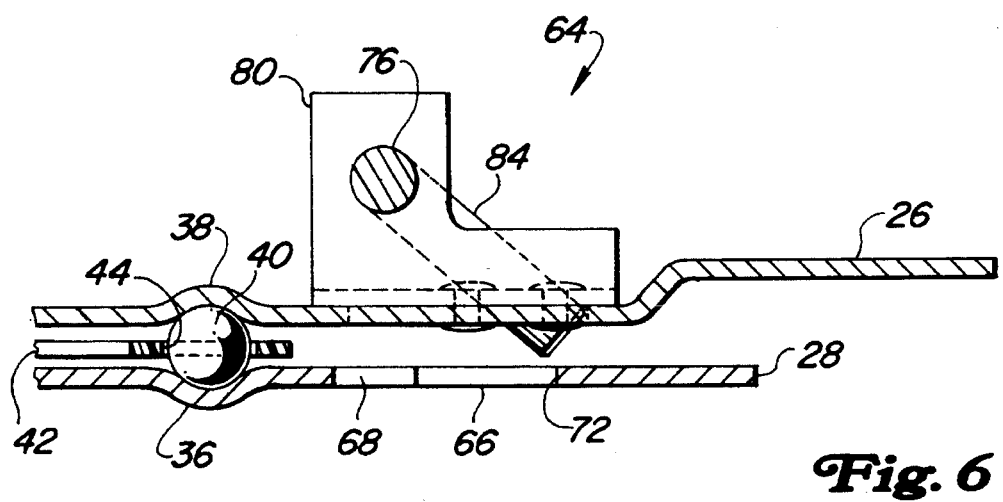
FIG. 6 is an enlarged fragmentary section showing part of the latch mechanism.

A lower element 24 is shown here in the form of a generally horizontal steel plate of substantially square configuration measuring in the order of eighteen by eighteen inches, dimensions given here merely to give a general idea of a representative size involved and from which representative sizes of associated parts may be derived. An upper plate-like element 26 is superimposed over and spaced somewhat above the lower element and is dimensioned approximately like the lower element. Although the elements 24 and 26 appear here as steel plates of approximately one-quarter inch in thickness, various equivalents could be used. The plates lend themselves to easy and low-cost manufacture while possessing the characteristics of more than adequate strength. The lower element has flanged and apertured portions 28 for attachment to the vehicle and the upper element has apertured flanges 30 for attachment to the bottom of the seat. A turntable or swivel means, generally designated 32 and best seen in exploded form in FIG. 7, mounts the upper element on the lower element for angular movement about an upright axis 34 centered in the elements 24 and 26 (FIG. 4). The turntable selected here for the present disclosure provides annular bearing means between the elements 24 and 26 and preferably embodies a lower annular raceway 36 formed in the lower element and an upper, complementary raceway 38 formed in the upper element. The raceways are slightly less than semi-circular in section and face each or complement each other to receive a plurality of rolling elements, here spherical bearings 40 retained in angularly spaced relation by a spacer ring 42 having apertures 44 for receiving the balls. When assembled with the turntable between them, and without angular restraint, the upper element is freely angularly movable about the turntable axis 34 through 360°. It remains, however, to interconnect the two elements against vertical separation.

Figure 7:
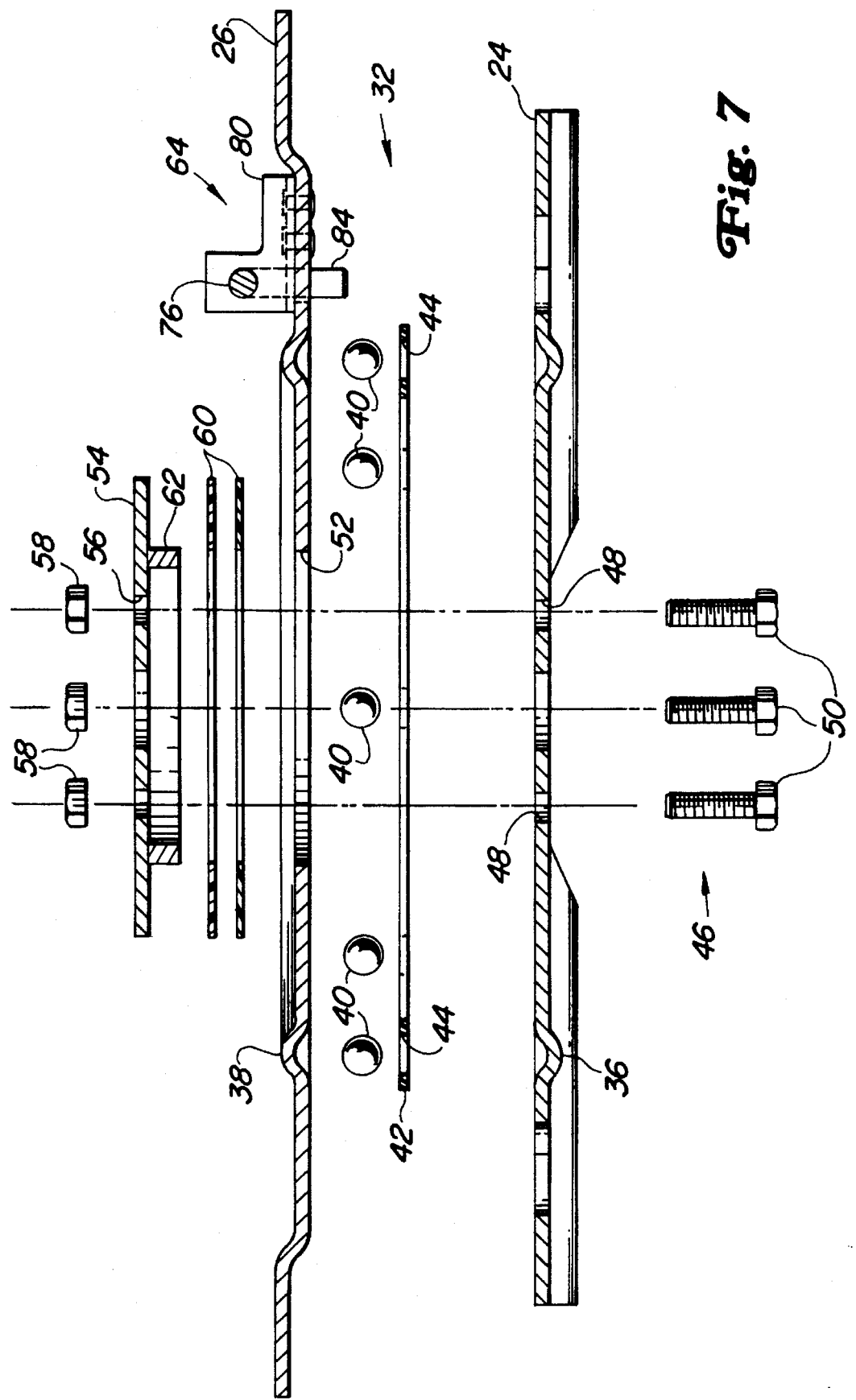
FIG. 7 is an "exploded" elevation of the elements, turntable and securing means.

The interconnecting or securing means is designated 46 and is best shown in exploded fashion in FIG. 7. See also FIGS. 4 and 8. The lower element has a circle of four bolt holes 48 about the axis 34 and within the turntable annulus and these receive four bolts 50 which pass upwardly through the annulus of the turntable as well as upwardly and loosely through a central opening 52 in the upper element and centered on the axis 34. The opening is shown as circular for ease of manufacture and will be described with respect to as coaxiality and concentricity relative of the axis 34 and turntable; although, the opening could be of any appropriate shape. Additionally, the bolts pass further upwardly through retainer means including a circular plate 54 of greater diameter than the opening 52 so as to overlie or overlap the opening about and engage the element 26, its portion bordering the opening. The retainer plate has a circle of bolt holes 56 aligned with the lower element bolt holes 48 for accommodating the bolts 50. Nuts 58 threaded onto the bolts complete the assembly except for bearing means comprising a pair of bearing rings 60 interposed between the underside of the retainer plate and the top side of the upper element bordering the opening 52, which bearing facilitates angular movement of the upper element, considering that the circle of bolts is fixed to both the lower element and to the retainer plate and thus remains stationary in the assembly. In order to prevent excess force being exerted by the nuts when torqued, the underside of the retainer plate provides stop means in the form of a ring 62 welded to the retainer plate and depending loosely through the upper element central opening 52 and abutting the lower element from above. See FIG. 8. The stop further prevents vertical deflection or deformation of the elements as well as preventing vertical overloading of the turntable when the nuts 58 are torqued. The bearing rings 60, like the turntable ball spacer ring 42, may be of any suitable plastic of low-friction qualities. Further, the annular stop 62 is a loose fit within the upper element opening 52, further avoiding unwanted friction.

From the description thus far, it will be seen that the seat and upper element as a unit have free angular movement about the vertical axis 34 relative to the lower element and vehicle support. At the same time, the elements are vertically interconnected by the securing means 46 which functions to tie the elements together in such manner as to resist vertical separation when subjected to pulling forces exerted against the upper element, as via a self-belted operator under extreme operating conditions.

The structure is further augmented by latch mechanism 64 (FIGS. 2, 6 and 9) made up of cooperating parts respectively on the upper and lower elements. As respects the lower element, the part is here shown as arcuate means in the form of a sector 66 formed in the element and having a plurality of notches or positions 68 opening to an arcuate slot 70 bordered by an arcuate portion 72 and closed at its opposite ends at 74 to provide stops as will presently appear.

The cooperating latch part carried by the upper element 26 takes the form of a transverse rod 76 journalled in a side portion of the upper element at 26 via an opening 78 and in a suitably apertured bracket 80 near a front central portion of the element. The outer end of the rod projects laterally and has a handle 82 convenient to the seat occupant. The inner end of the rod is bent down as a leg 84 which is selectively cooperative with the notches in the sector 66. A spring 86 biases the rod angularly in the direction of notch engagement by the rod leg 84.

Figure 2:
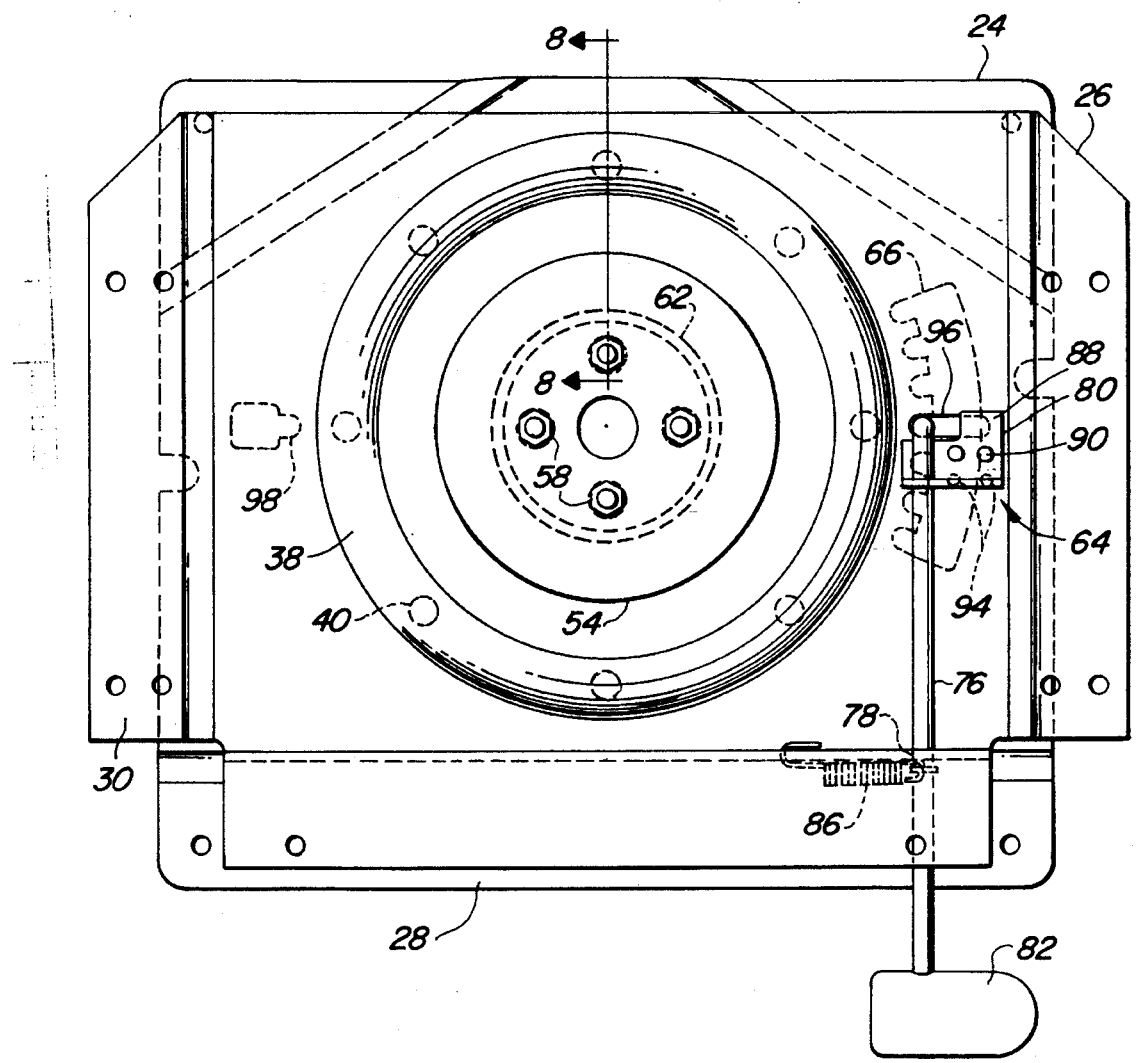
FIG. 2 is a plan, on a larger scale, of the swivel structure with the seat removed.
Figure 3:
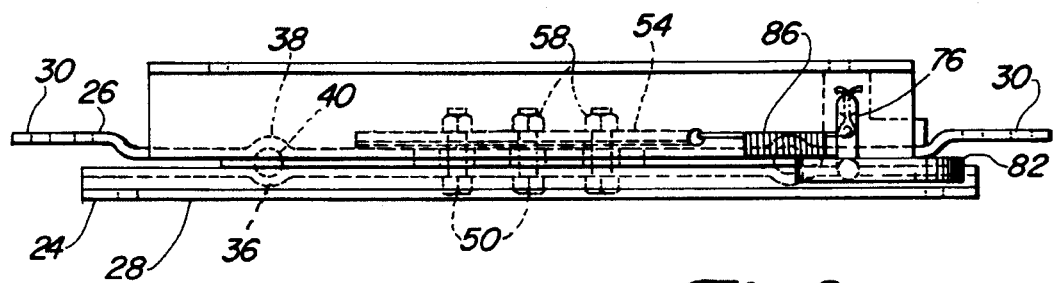
FIG. 3 is an elevation of the structure shown in FIG. 2.

In one mode of operation of the latch means, the rod is rocked manually to move the leg 84 out of one notch 78 and released for engagement with another notch in the sector. In the present case, by way of example, the notches are spaced angularly apart by seven degrees and there are six notches, making a total angular range of forty-two degrees or twenty-one degrees to each side of a central or straight-ahead position of the seat. The sector stops 74 are thus spaced angularly apart according to this range, which is, of course, less than 180°. In the position of the inner rod bracket 80 as shown in FIGS. 2 and 4, for example, forward swinging of the lower end of the rod leg 84 is limited by a lip 88 on the bracket 80 so that the end of the leg can escape the notches but cannot escape the sector slot 70 and the slot front edge 72. This thus confines the arcuate range of the seat in the first mode to the arcuate extent of the sector slot, here forty-two degrees.

Figure 9:
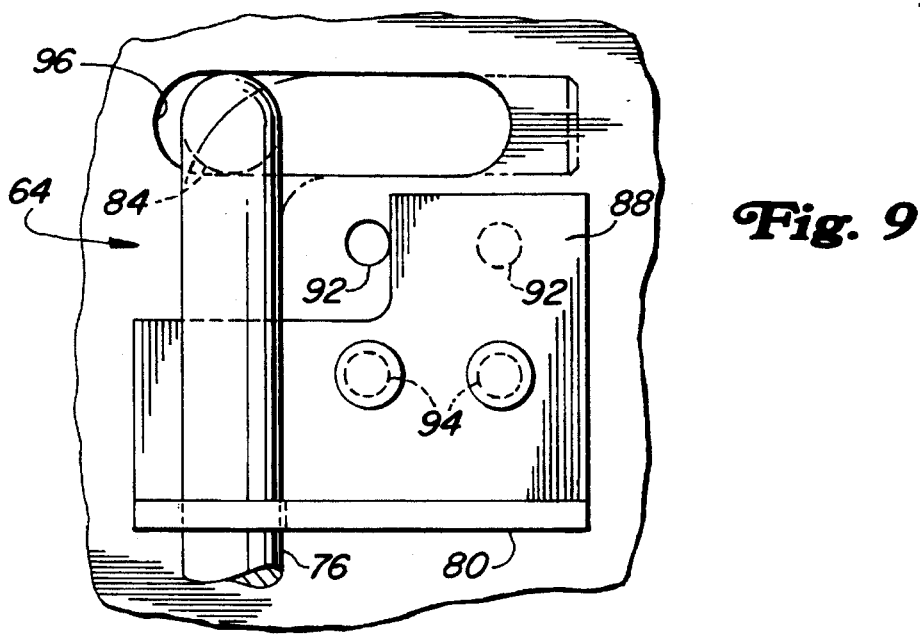
FIG. 9 is a partial plan showing an altered status of part of the latch mechanism.

The bracket 80 has two positions, one of which has been just described, being held in place by removable fasteners such as pop rivets 90 through an inner pair of openings 92 in the upper element 26 (See FIG. 9). The upper element has a second pair of openings 94 (FIGS. 2 and 4) spaced laterally outwardly from the inner openings and the rivets may be drilled out or otherwise removed so that the bracket may be moved outwardly and re-fastened with rivets or the like in the outer openings, a position shown in FIG. 9. This moves the bracket lip 88 outwardly to clear the front portion of a short fore-and-aft slot 96 in the upper element in which the rod leg 94 moves, thereby enabling the leg to move farther forwardly and upwardly (FIG. 6) so as to escape the sector slot and thus the slot end stops 74, whereby the upper element and seat are free to swing angularly free of the confines of the sector.

With the bracket 80 in the position just described, a second mode of operation of the latch means may be attained, in this case giving the upper element and seat an angular range of 180° so that the seat faces backwards. Locking of the seat in this reversed portion or mode is accomplished by receipt of the rod leg 84 in a rear notch 98 in the lower element. See FIG. 5. The notch, in the present embodiment is shaped as shown so as to facilitate movement of the rod leg into and out of locking position.

A third mode of operation is available when the rod is rocked and manually retained to keep the rod leg free of both the rear notch and the front sector so that the seat can swing freely on the turntable, but it is preferred that the rod be releasable to re-engage the rod leg in the front sector in a straight-ahead position. Of course, when the seat is facing forwardly, driving of the tractor is facilitated and, in some conditions, positioning of the seat in one of the positions to either side or straight forward and within the range of forty-two degrees may render more convenient certain aspects of tractor operation. Further, when the latch mechanism is released to clear the sector, entering and leaving the tractor are easier.

As noted, the present disclosure is based on a preferred embodiment of the invention which has the attributes of low-cost, rugged construction, flexibility and versatility in operation and convenient latch mechanism. Features and advantages other than those specifically pointed out will occur to those versed in the art, as will many modifications in the preferred embodiment presented, all without departing from the spirit and scope of the invention.

I claim:

1. Swivel Mechanism for a seat or the like, comprising: a lower, fixed substantially horizontal plate-like element an upper substantially horizontal element superimposed over and spaced above the lower element and having a through opening centered on a vertical axis passing through the elements, turntable means in the form of an annulus about said axis and interposed between the elements for supporting the upper element for angular movement on the lower element, retainer means centered on said axis and overlying the upper element opening, annular bearing means interposed between an under portion of the retainer means and a top portion of the upper element, adjustable securing means centered on said axis and engaging the lower element within the turntable annulus and extending upwardly through the turntable annulus and through the upper element opening and engaging the retainer means, said securing means being operative to draw the upper element downwardly relative to the lower element, and stop means additional to the bearing means and interposed between the retainer means and the lower element to limit said downward movement of the upper element and latch means selectively lockable between the elements to prevent angular movement of the upper element and releasable to enable such angular movement, said latch means being operative in first, second and third modes when released and re-locked to provide for angular movement of the upper element respectively in a first range of less than 180° a second range of 180° and a third range of 360°.

2. Swivel Mechanism according to claim 1, in which the lower element has an arcuate means, said arcuate means having a plurality of angularly spaced apart lock positions, stops at opposite angularly spaced-apart ends of the arcuate means operative to determine the angular range of the arcuate means, a latch member movable on the upper element for selective engagement with and release from the lock positions, means biasing the latch member toward lock position engagement, and limit means engageable with the latch member to limit its movement to enough for release from the lock positions but less than enough to clear the stops.

3. Swivel mechanism according to claim 2, in which the limit means is selectively positionable to enable additional release movement of the latch member sufficient to clear the stops and thus to provide for angular movement of the upper element beyond the range of the arcuate means.

4. Swivel mechanism according to claim 3, including a latch-member-receivable portion on the lower element spaced angularly beyond the range of the arcuate means for fixing the upper element in a position angularly clear of the arcuate means.

5. Swivel mechanism according to claim 4, in which the latch-receivable portion is spaced angularly on the order of 180° from the mid-point of the arcuate means.

6. Swivel mechanism according to claim 4, in which the latch-member-receivable portion on the upper element is so constructed that the latch member, when held in its released position will clear said portion so as to enable 360° angular movement of the upper element.

7. For a vehicle seat construction having an upper, seat-carrying element and a lower support-attachable element swiveled together on an upright axis for angular movement of the upper element relative to the lower element, the improvement residing in selectively lockable and releasable latch mechanism operative between the elements for controlling the arcuate range of movement of the upper element, comprising arcuate means on the lower element having a plurality of angularly spaced apart lock positions, stops at opposite angularly spaced-apart ends of the arcuate means an arcuate length along the arcuate means defined by said stops, the range of the arcuate means being determined by said arcuate length, a latch member moveable on the upper element for selectively engagement with and release from the lock positions, means biasing the latch member toward lock position engagement, and limit means engageable with the latch member to limit its movement to enough for release from the lock positions but less than enough to clear the stops.

8. The improvement according to claim 7, in which the limit means is selectively positionable to enable additional release movement of the latch member sufficient to clear the stops and thus to provide for angular movement of the upper element beyond the range of the arcuate means.

9. The improvement according to claim 8, including a latch-member-receivable portion on the lower element spaced angularly beyond the range of the arcuate means for fixing the upper element in a position angularly clear of the arcuate means.

10. The improvement according to claim 9, in which the latch-receivable portion is spaced angularly on the order of 180° from the mid-point of the arcuate length.

11. The improvement according to claim 9, in which the latch-member-receivable portion on the upper element is so constructed that the latch member, when held in its released position will clear said portion so as to enable 360° angular movement of the upper element.

12. Swivel Mechanism for a seat or the like, comprising: a lower, fixed substantially horizontal plate-like element an upper substantially horizontal element superimposed over and spaced above the lower element and having a through opening centered on a vertical axis passing through the elements, turntable means in the form of an annulus about said axis and of greater diameter than said opening and interposed between said elements, bearing means concentric with said axis and in the form of a ring lying atop the upper element in bordering relation to the opening and within the annulus of the turntable means, a retainer plate concentric with said axis and of greater diameter than said opening and lying atop of and radially overlapping the bearing ring, securing means extending vertically through the opening and interconnecting the retainer plate and the lower element for securing the plate and the lower element against vertical separation, said securing means being manually adjustable during use of the seat to vary the torque and thus the force and loading on the bearing ring and turntable means, and upright stop means passing loosely through the opening and interposed and engageable between the bottom of the retainer plate and the top of the lower element for preventing the application of excessive vertical forces to the bearing ring and turntable means responsive to over-torquing of the securing means during use of the seat.

13. Swivel mechanism according to claim 12, in which the stop means is a ring having an annular top edge engageable with the bottom of the retainer plate and an annular bottom edge engageable with the top of the lower element.

14. A swivel mechanism according to claim 13, in which the stop ring top edge is affixed to the bottom of the retainer plate.

15. A swivel mechanism according to claim 13, in which the securing means comprises a circle of bolts concentrically within the stop ring and operative to spread the load on the bearing ring (60) and turntable means.

* * * * *